United States Patent

Niizeki et al.

[11] Patent Number: 6,142,760
[45] Date of Patent: Nov. 7, 2000

[54] DRIVE CONTROL APPARATUS FOR ELECTRIC INJECTION MOLDING MACHINE

[75] Inventors: Nobuya Niizeki; Motohiro Kobayashi, both of Niigata, Japan

[73] Assignee: Niigata Engineering Co., Ltd., Tokyo, Japan

[21] Appl. No.: 09/220,404

[22] Filed: Dec. 24, 1998

[51] Int. Cl.⁷ .................................................. B29C 45/77
[52] U.S. Cl. ........................... 425/145; 425/149; 425/150
[58] Field of Search ..................... 425/145, 146, 425/149, 150

[56] References Cited

U.S. PATENT DOCUMENTS 5,792,483  8/1998  Siegrist et al. .
5,911,924  6/1999  Siegrist et al. .

FOREIGN PATENT DOCUMENTS 43 14 722 C1  5/1993  Germany .

Primary Examiner—Tim Heitbrink
Attorney, Agent, or Firm—Scully, Scott, Murphy & Presser

[57] ABSTRACT

A drive control apparatus is provided for an electric injection molding machine, in which a screw is used to inject melted resin into a cavity of a metal mold. Herein, the screw is driven to move in a desired direction by using first and second servo motors, which are connected together using a belt, for example. In the drive control apparatus, a motion controller produces a drive control signal to control operation of the screw. A master servo amplifier inputs the drive control signal to control the first servo motor, wherein a position of a rotor of the first servo motor is detected and is used as a feedback value. The master servo amplifier further produces a torque instruction signal representing a ratio against rated output of the first servo motor by which the first servo motor is to be driven. For example, frequency of the torque instruction represents rotation speed of the motor, while amplitude represents magnitude of torque. A slave servo amplifier controls the second servo motor based on the torque instruction signal. The motion controller is capable of producing a synchronizing signal, which is delivered to the master and slave servo amplifiers so that the first and second servo motors are driven in a synchronized manner.

8 Claims, 10 Drawing Sheets

DRIVE CONTROL APPARATUS FOR ELECTRIC INJECTION MOLDING MACHINE

BACKGROUND OF THE INVENTION

1. Field of the Invention

This invention relates to drive control apparatuses for electric injection molding machines that are used for injection molding of resin.

This application is based on Patent Application No. Hei 9-184194 filed in Japan, the content of which is incorporated herein by reference.

2. Description of the Related Art

In general, resin molding is performed as follows:

The screws inject melted resin into cavities whose interior walls contribute to formation of exterior shapes of molded goods, wherein the predetermined pressured is applied to the injected resin.

In the electric injection molding machine, servo motors are normally provided for the injection device used for injection and the closing device used for closing (or clamping) of the cavity respectively. However, as the scale of the injection molding machine becomes large, an amount of required drive torque becomes large as well.

The electric injection molding machine of the present technology uses the synchronous ac servo motors in general. However, there is a limit in maximum torque which can be produced by one servo motor. For this reason, the electric injection molding machine of the large scale comprises multiple servo motors, which are subjected to synchronous drive to produce the "required" torque.

Next, a description will be given with respect to examples of drive control apparatuses for controlling servo motors employed in the electric injection molding machine with reference to FIG. 9 and FIG. 10.

FIG. 9 shows a first example of the drive control apparatus for controlling multiple servo motors. In FIG. 9, a rectifier 10 and a capacitor C construct an inverter, which converts three-phase alternating current supplied from a three-phase alternating current power source E to direct current. Two transistorized inverters 12 and 12' are connected to output terminals of the rectifier 10.

The transistorized inverter 12 comprises three sets of switching circuits, which are provided to supply predetermined currents with respect to three phases (i.e., phases U, V and W) of a servo motor M1. Herein, each of the switching circuits is configured by two transistors and two diodes. For example, the switching circuit supplying current for the phase U of the servo motor M1 is configured by two transistors $T_A$, $T_B$, which are connected in series between the output terminals of the rectifier 10, and two diodes D, D which are connected in series between the output terminals of the rectifier 10. Herein, a connection point between the transistors $T_A$, $T_B$ is placed in a conducted state with a connection point between the diodes D, D. Other switching circuits provided for the other phases V and W are configured similar to the aforementioned switching circuit provided for the phase U. Thus, those three switching circuits are connected to the servo motor M1 with respect to the phases U, V and W respectively.

The transistorized inverter 12' has roughly an identical configuration of the aforementioned transistorized inverter 12. So, the description regarding details of the transistorized inverter 12' is omitted.

Incidentally, the transistorized inverter 12 is configured using six transistors $T_A$ to $T_F$, while the transistorized inverter 12' is configured using six transistors $T_A'$ to $T_F'$.

A transistor PWM control circuit 14 (where "PWM" is an abbreviation for "Pulse-Width Modulation") is connected to bases of the aforementioned twelve transistors in total.

The servo motor M1 is equipped with a position detector 18 for detecting rotating position of a rotor as well as current detectors 20, 22 for detecting currents flowing across the phases U and W respectively. Herein, the position detector 18 produces a position detection value S, while the current detectors 20, 22 produce current detection values $I_U$, $I_W$ respectively. Those values are input to the transistor PWM control circuit 14.

The transistor PWM control circuit 14 changes on/off times and time intervals of the transistors $T_A$ to $T_F$ and $T_A'$ to $T_F'$ in response to a speed instruction signal Vo output from a controller 16 and the position detection signal S input thereto. Thus, it controls amounts of currents flowing across the phases of the servo motors M1, M2 so as to control rotation speeds of the servo motors M1, M2.

As described above, in the first example of the drive control apparatus, a single transistor PWM control circuit 14 controls the two transistorized inverters 12, 12' in response to the speed instruction signal Vo given from the controller 16 and the position detection value S which is detected with regard to one servo motor M1. Thus, it is capable of driving the two motors M1, M2 in a synchronized manner.

FIG. 10 shows a second example of the drive control apparatus for controlling multiple servo motors. In FIG. 10, a reference symbol "30" designates a main body of a control unit that is configured by a digital controller 32 and a motor interface 34. The digital controller 32 is connected to a master servo amplifier 38 by means of a pressure-control printed-circuit board (I/F) 36. The master servo amplifier 38 drives a servo motor 42. In addition, a slave servo amplifier 40 drives a servo motor 44. That is, an injection member 46 is driven by the servo motors 42 and 44.

A load cell 48 detects pressure which is applied by the injection member 46. Then, a detection value of the load cell 48 is input to the pressure-control printed-circuit board 36.

The servo motors 42 and 44 are respectively equipped with speed detectors (TG) 50 and 52, which in turn detect rotation speeds of the servo motors 42 and 44 respectively. Detection results of the speed detectors 50 and 52 are input to the master servo amplifier 38 and the slave servo amplifier 40 respectively.

Instruction data (or command data) are input to the digital controller 32 in advance to determine "preset pressure", by which the master servo amplifier 38 drive both of the servo motors 42 and 44 so that the injection member 46 moves forward and backward. Namely, the second example of the drive control apparatus is designed as follows:

Based on control signals output from the master servo amplifier 38, it performs speed control on the servo motors 42 and 44 in such a way that their rotation speeds are adjusted uniformly in an electrical manner.

The aforementioned examples of the drive control apparatuses suffer from problems as follows:

The aforementioned first example of the drive control apparatus shown in FIG. 9 is designed in such a way that the two transistorized inverters 12 and 12' are provided for the servo motors M1 and M2 respectively, wherein they are driven by a single transistor PWM control circuit 14 to control operations of the servo motors M1 and M2. For this reason, the first example requires specially designed configurations for the servo motors M1 and M2 as well as the their control devices. In addition, those configurations should be complicated ones.

In addition, the second example of the drive control apparatus shown in FIG. 10 is designed to perform speed control by merely adjusting rotation speeds of the servo motors 42 and 44 in an electrical manner. For this reason, the second example is somewhat weak against disturbances. So, hunting easily occurs in control of the second example.

SUMMARY OF THE INVENTION

It is an object of the invention to provide a drive control apparatus that is capable of controlling multiple servo motors, equipped in an electric injection molding machine, with a simple configuration and with a high precision.

A drive control apparatus of this invention is provided for an electric injection molding machine, in which a screw is used to inject melted resin into a cavity of a metal mold. Herein, the screw is driven to move in a desired direction by using two servo motors, which are connected together using a belt, for example. In the drive control apparatus, a motion controller produces a drive control signal to control operation of the screw. A master servo amplifier inputs the drive control signal to control the servo motor thereof, wherein a position of a rotor is detected and is used as a feedback value. The master servo amplifier further produces a torque instruction signal representing a ratio against rated output of the servo motor by which the servo motor is to be driven. For example, frequency of the torque instruction signal represents (motor) rotation speed, while amplitude represents magnitude of torque. A slave servo amplifier controls the servo motor thereof based on the torque instruction signal.

Therefore, the master servo amplifier performs position control, speed control and torque control on the servo motor while the slave servo amplifier performs only torque control on the servo motor. Thus, it is possible to resist disturbances, and it is possible to perform drive control on the servo motors in a stable manner.

Further, the motion controller is capable of producing a synchronizing signal, which is delivered to the master and slave servo amplifiers so that the servo motors are driven in a synchronized manner.

Because the slave servo amplifier contributes to only the torque control of the servo motor, it is unnecessary to provide same capacity for each of the servo motors. In other words, it is possible to use different capacities for the servo motors respective. This provides a high degree of freedom in design of the machine as a whole.

BRIEF DESCRIPTION OF THE DRAWINGS

These and other objects, aspects and embodiment of the present invention will be described in more detail with reference to the following drawing figures, of which.

DESCRIPTION OF THE PREFERRED EMBODIMENT

This invention will be described in further detail by way of examples with reference to the accompanying drawings.

[A] Embodiment 1

Figure 1:
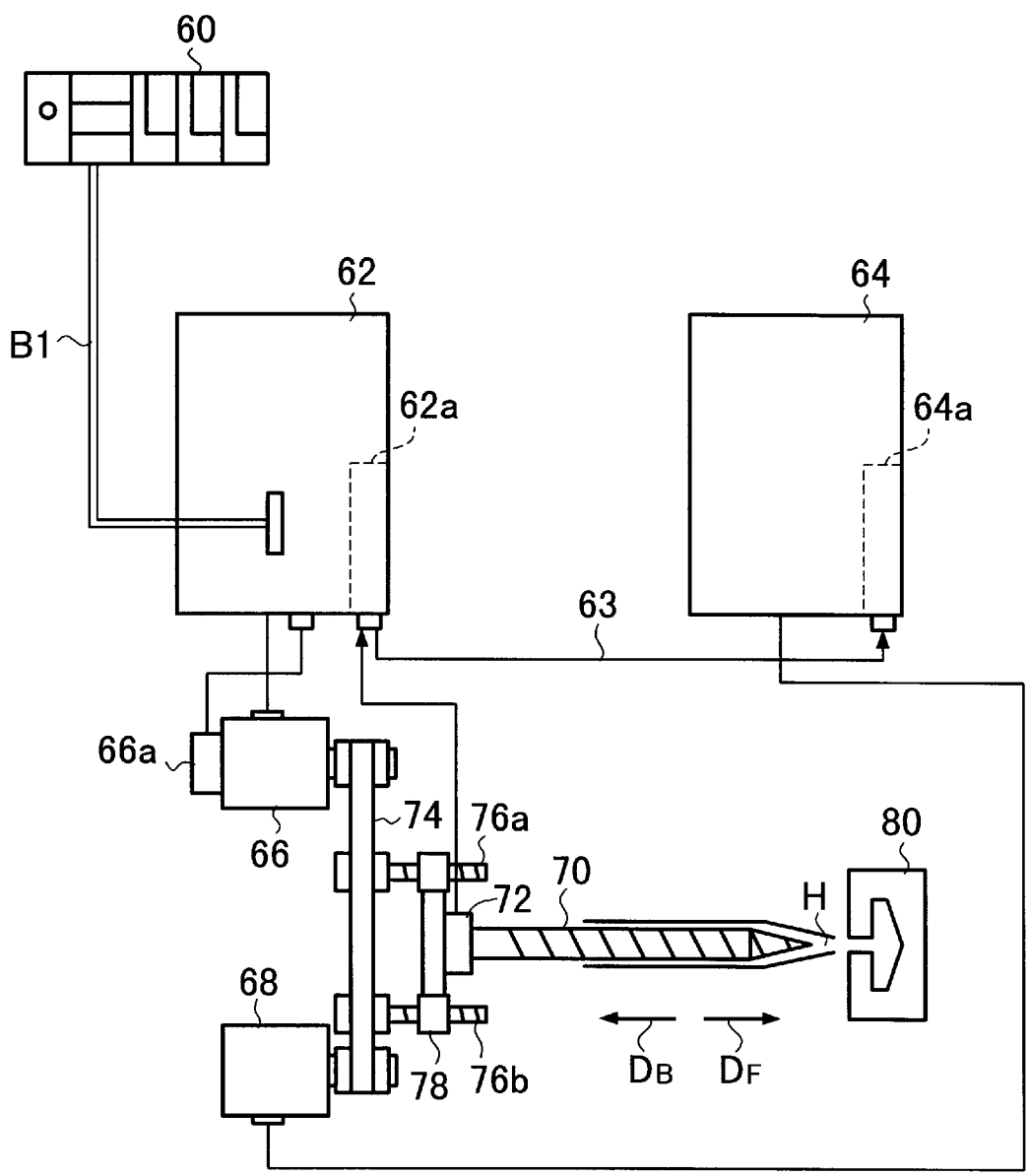
FIG. 1 is a schematic diagram showing an outline construction of a drive control apparatus for an electric injection molding machine in accordance with embodiment 1 of the invention.

FIG. 1 is a schematic diagram showing an outline construction of a drive control apparatus for an electric injection molding machine in accordance with embodiment 1 of the invention. In FIG. 1, a motion controller 60 controls a screw 70 equipped in the electric injection molding machine. The motion controller 60 outputs a signal (called "drive instruction signal") to a master servo amplifier 62 via a signal line B1. The drive instruction signal controls operational factors of the screw 70 such as a movement instruction that instructs the screw 70 to move in directions of arrows designated by reference symbols of $D_F$ and $D_B$ as well as injection speed, injection pressure and back pressure.

The master servo amplifier 62 is equipped with a PWM control circuit and an inverter (or inverters), all of which are not shown in FIG. 1. So, the master servo amplifier 62 drives a servo motor 66 on the basis of the drive instruction signal which is supplied thereto from the motion controller 60 via the signal line B1.

The servo motor 66 is equipped with a position detector 66a that detects a position of a rotor of the servo motor 66. An detection value of the position detector 66a is supplied to the master servo amplifier 62.

That is, the master servo amplifier 62 uses the detection value of the position detector 66a attached to the servo motor 66 as a feedback value to perform feedback control on the servo motor 66.

The master servo amplifier 62 is equipped with a torque instruction calculation unit 62a, which calculates a ratio between rated output of the servo motor 66 and an output for driving the servo motor 66 in response to the drive instruction signal output from the motion controller 60.

For example, when the master servo amplifier 62 provides the servo motor 66 with an output that corresponds to 60% of the rated output, the torque instruction calculation unit 62a produces a ratio of 60% by calculations.

Then, the calculated ratio is converted to an analog signal representing a sine wave and the like, which will be referred to as a torque instruction signal. Herein, the torque instruction signal is defined by frequency and amplitude, wherein the frequency represents motor speed while the amplitude represents magnitude of torque. Incidentally, servo motors 66 and 68 are provided to drive the screw 70.

Like the master servo amplifier 62, a slave servo amplifier 64 is equipped with a PWM control circuit and an inverter (or inverters), all of which are not shown in FIG. 1. The slave servo amplifier 64 receives the torque instruction signal, which is transmitted thereto from the master servo amplifier 62 via a signal line 63. Thus, the slave servo amplifier 64 drives the servo motor 68 on the basis of the torque instruction signal.

The slave servo amplifier 64 is equipped with a torque instruction signal input unit 64a which inputs the torque instruction signal output from the master servo amplifier 62. Based on the input torque instruction signal, the torque instruction signal input unit 64a calculates switching speeds of transistors constructing the inverter provided in the slave servo amplifier 64 as well as an amount of current to be flown across the servo motor 68. Based on such calculation results, the torque instruction signal input unit 64a outputs control signals to the PWM control circuit provided in the slave servo amplifier 64.

For example, in the case where the master servo amplifier 62 drives the servo motor 66 with 60% of its rated output, the torque instruction signal represents a signal declaring that the servo motor is driven with 60% output, so the slave servo amplifier 64 drives the servo motor 68 with 60% of its rated output. In the case where the master servo amplifier 62 drives the servo motor 66 with 10% of its rated output, the slave servo amplifier 64 drives the servo motor 68 with 10% of its rated output.

A belt 74 interconnects rotation shafts of the servo motors 66 and 68 together. In addition, feed screws 76a and 76b constructing a slide unit are connected with the belt 74. So, rotation power of the servo motors 66 and 68 is transmitted to the feed screws 76a and 76b by means of the belt 74. Screw portions of the feed screws 76a and 76b engage with nut holes formed at respective positions of a fixing member 78 for fixing the screw 70 together with a load cell 72. Thus, as the feed screws 76a and 76b rotate, an assembly of the fixing member 78, load cell 72 and screw 70 moves in the direction $D_F$ or direction $D_B$.

Figure 2:
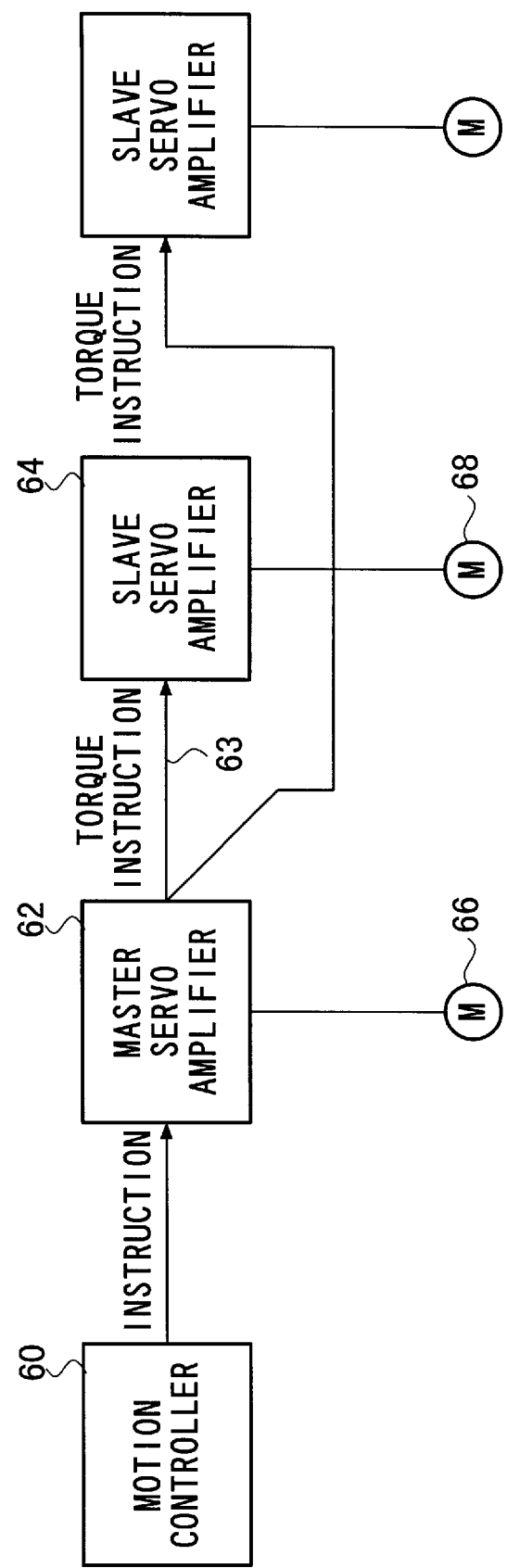
FIG. 2 is a block diagram showing a simplified configuration establishing connections between servo amplifiers and servo motors in the embodiment 1 of the invention.

Simply speaking, the drive control apparatus of the embodiment 1 described above has a configuration that a single servo motor is equipped with a single servo amplifier, which is shown in FIG. 2. FIG. 2 is a schematic block diagram showing a simplified configuration establishing connections for the servo amplifiers and servo motors. According to the present embodiment, one of multiple servo amplifiers is used as the master servo amplifier 62, from which the torque instruction signal is output to the remained slave servo amplifiers.

For convenience' sake, FIG. 1 shows only one slave servo amplifier 64. However, it is possible to modify the construction of FIG. 1 such that the master servo amplifier 62 is connected with multiple (slave) servo amplifiers.

Figure 3:
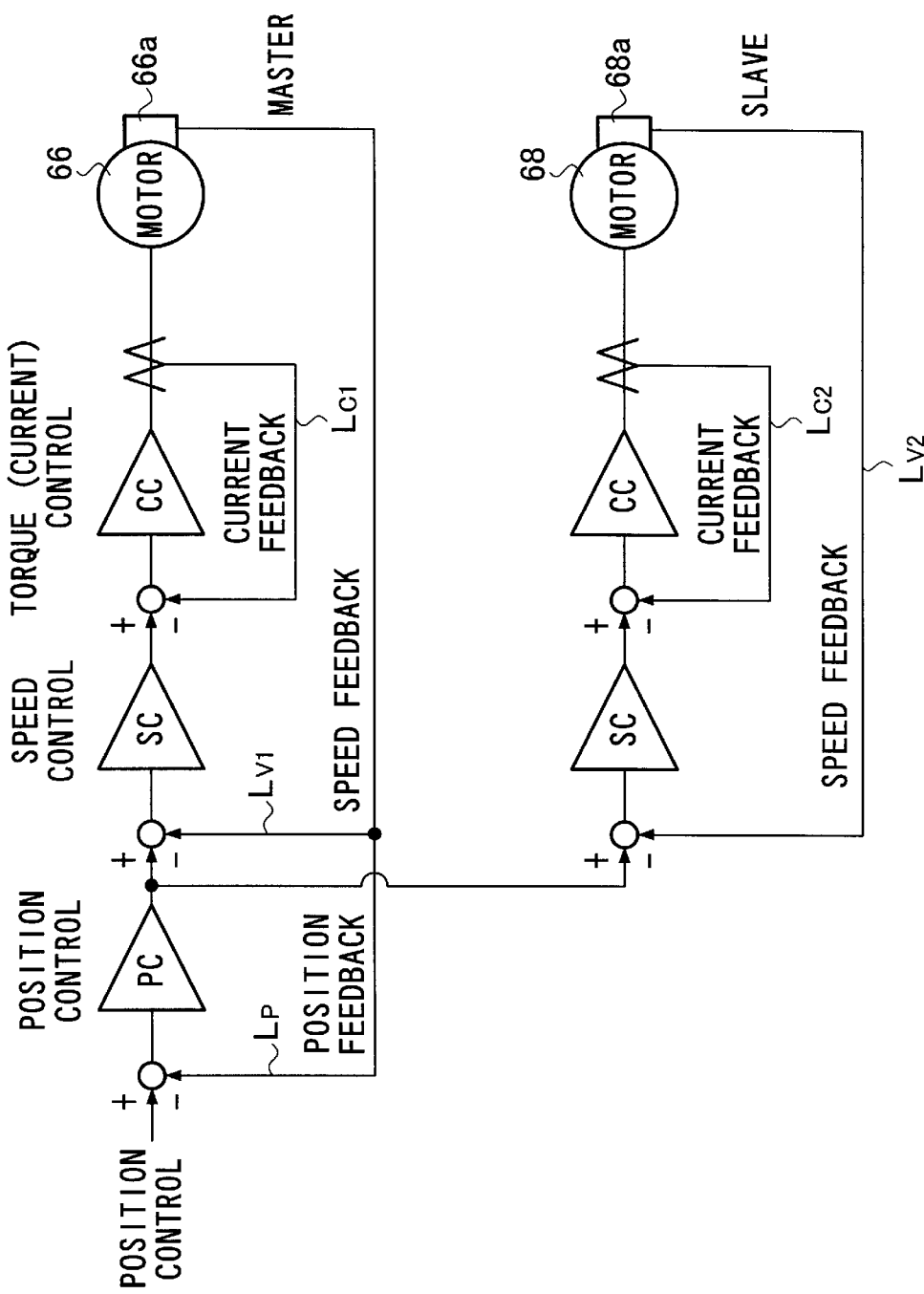
FIG. 3 is a schematic symbol diagram for explaining an example of speed control.
Figure 4:
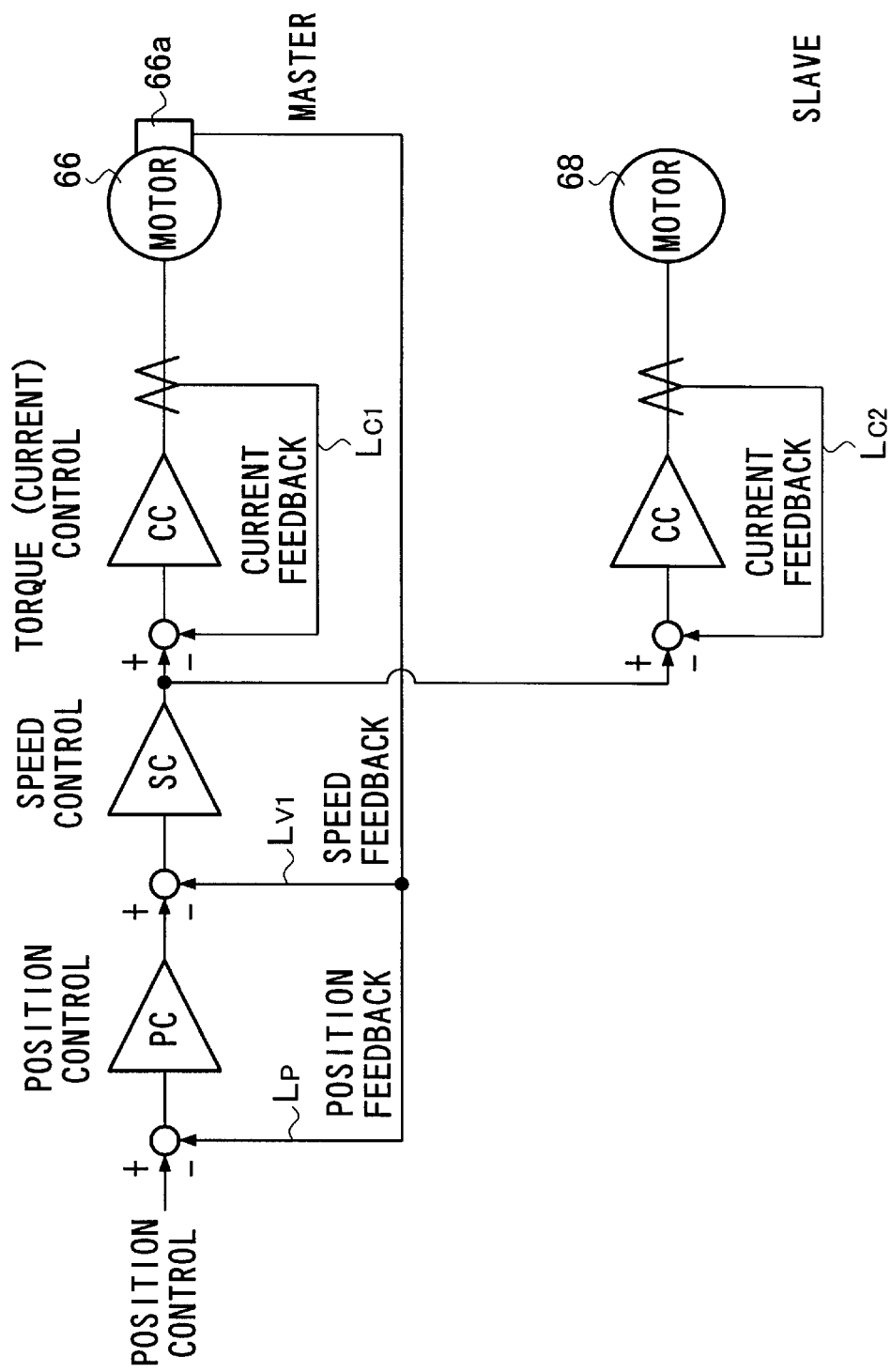
FIG. 4 is a schematic symbol diagram for explaining an example of torque control.

Next, a description will be given with respect to differences between the speed control and torque control effected by the drive control apparatus. FIG. 3 is a schematic symbol diagram for explaining the speed control, while FIG. 4 is a schematic symbol diagram for explaining the torque control. Herein, same reference symbols are used to designate same parts in FIG. 3 and FIG. 4. In addition, an overall configuration of FIG. 3 or FIG. 4 is classified into two portions, wherein an upper portion corresponds to master system while a lower portion corresponds to slave system.

In general, the servo motor is controlled using position control, speed control and torque control (or current control). In case of FIG. 3, the master system feeds back a detection value output from an encoder such as the position detector 66a attached to the servo motor 66, so that position control is performed in a loop Lp while speed control is performed in a loop Lv1. In addition, by detecting and feeding back current flowing across the servo motor 66, the master system performs torque control in a loop Lc1.

By feeding back the detection value of the encoder such as the position detector 68a attached to the servo motor 68, the slave system shown in FIG. 3 performs speed control in a loop Lv2. In addition, by detecting and feeding back current flowing across the servo motor 68, it performs torque control in a loop Lc2.

If the servo motors 66 and 68 are interconnected with each other by rigid body, no problem occurs due to disturbances. However, the drive control apparatus of the embodiment 1 is constructed such that the servo motors 66 and 68 are interconnected with each other by the belt 74 (see FIG. 1). In such embodiment 1, when disturbance occurs, hunting is easily caused to occur because the loops Lv1 and Lv2 function independently of each other.

Different from the circuitry of FIG. 3, the circuitry of FIG. 4 is designed as follows:

The loop Lv2 shown in FIG. 3 is omitted. In addition, a torque control portion of the slave system is connected to a point between a speed control portion and a torque control portion of the master system. Incidentally, a signal which is output from the master system to the slave system corresponds to the aforementioned torque instruction signal, which is described before with reference to FIG. 1.

In case of the circuitry of FIG. 4, when disturbance occurs, speed control is performed only in the loop Lv1 while the torque control is performed by the master system and slave system independently with each other. Such configuration of FIG. 4 has an advantage that hunting is not caused to occur because the servo motors 66 and 68 do not differ from each other in rotation speed.

Next, operation of the present embodiment will be described.

In FIG. 1, the motion controller 60 supplies the master servo amplifier 62 with a supply instruction signal for driving the screw 70 to move in the direction $D_B$. Thus, the master servo amplifier 62 drives the servo motor 66 in response to a difference between the supply instruction signal and a detection value of the position detector 66a. In addition, the torque instruction calculation unit 62a of the master servo amplifier 62 calculates a torque instruction signal, which is then supplied to the slave servo amplifier 64.

The torque instruction signal input unit 64a of the slave servo amplifier 64 performs calculations based on the torque instruction signal. Namely, the torque instruction signal input unit 64a calculates switching speeds of the transistors constructing the inverter based on frequency of the torque instruction signal, while it calculates an amount of current to be flown across the servo motor 68 on the basis of amplitude of the torque instruction signal. Based on results of the calculations, the torque instruction signal input unit 64a outputs control signals to the PWM control circuit provided inside of the slave servo amplifier 64. Based on the control signals, the PWM control circuit drives the inverter to drive the servo motor 68.

Now, supply operation is carried out as follows:

The motion controller 60 outputs a screw rotation instruction to a screw-rotation servo amplifier (not shown), so that the screw 70 rotates. At the same time, it outputs a back pressure instruction to the master servo amplifier 62, so that the master servo amplifier 62 and slave servo amplifier 64 drive the servo motors 66 and 68 respectively, by which back pressure control is made. As a result, melted resin for injection is accumulated in a portion "H".

Next, the motion controller 60 supplies the master servo amplifier 62 with an injection instruction signal to move the screw 70 in the direction $D_F$. The master servo amplifier 62 drives the servo motor 66 in response to a difference between the injection instruction signal and a detection value of the position detector 66a. In addition, the torque instruction signal calculation unit 62a of the master servo amplifier 62 calculates a torque instruction signal, which is then output to the slave servo amplifier 64.

The torque instruction signal input unit 64a of the slave servo amplifier 64 inputs the torque instruction signal to perform calculations. That is, the torque instruction signal input unit 64a calculates switching speeds of the transistors constructing the inverter on the basis of frequency of the torque instruction signal, while it also calculates an amount of current to be flown across the servo motor 68 on the basis of amplitude of the torque instruction signal. Thus, the torque instruction signal input unit 64a outputs control signals to the PWM control circuit provided inside of the slave servo amplifier 64. Based on the control signals, the PWM control circuit drives the inverter to drive the servo motor 68.

As described above, the master servo amplifier 62 and the slave servo amplifier 64 drive the servo motors 66 and 68 respectively. Thus, the screw 70 moves in the direction $D_F$. As the screw 70 moves in the direction $D_F$, melted resin accumulated in the portion H is injected into inside of a metal mold 80.

The present embodiment is summarized as follows:

The master servo amplifier 62 and the slave servo amplifier 64 do not perform speed control independently. But, only the master servo amplifier 62 performs the speed control, while the slave servo amplifier 64 exclusively drives the servo motor 68 based on the torque instruction signal output from the master servo amplifier 62. Thus, it is possible to avoid occurrence of hunting.

In addition, the torque instruction signal, which is output from the master servo amplifier 62 to the slave servo amplifier 64, corresponds to a ratio between the rated output of the servo motor 66 and the output of the master servo amplifier 62. For this reason, it is unnecessary to match capacity of the servo motor 66 provided for the master servo amplifier 62 with capacity of the servo motor 68 provided for the slave servo amplifier 64. That is, it is possible to provide a combination of different servo motors in such a way that one servo motor has a large capacity while the other has a small capacity.

[B] Embodiment 2

Figure 5:
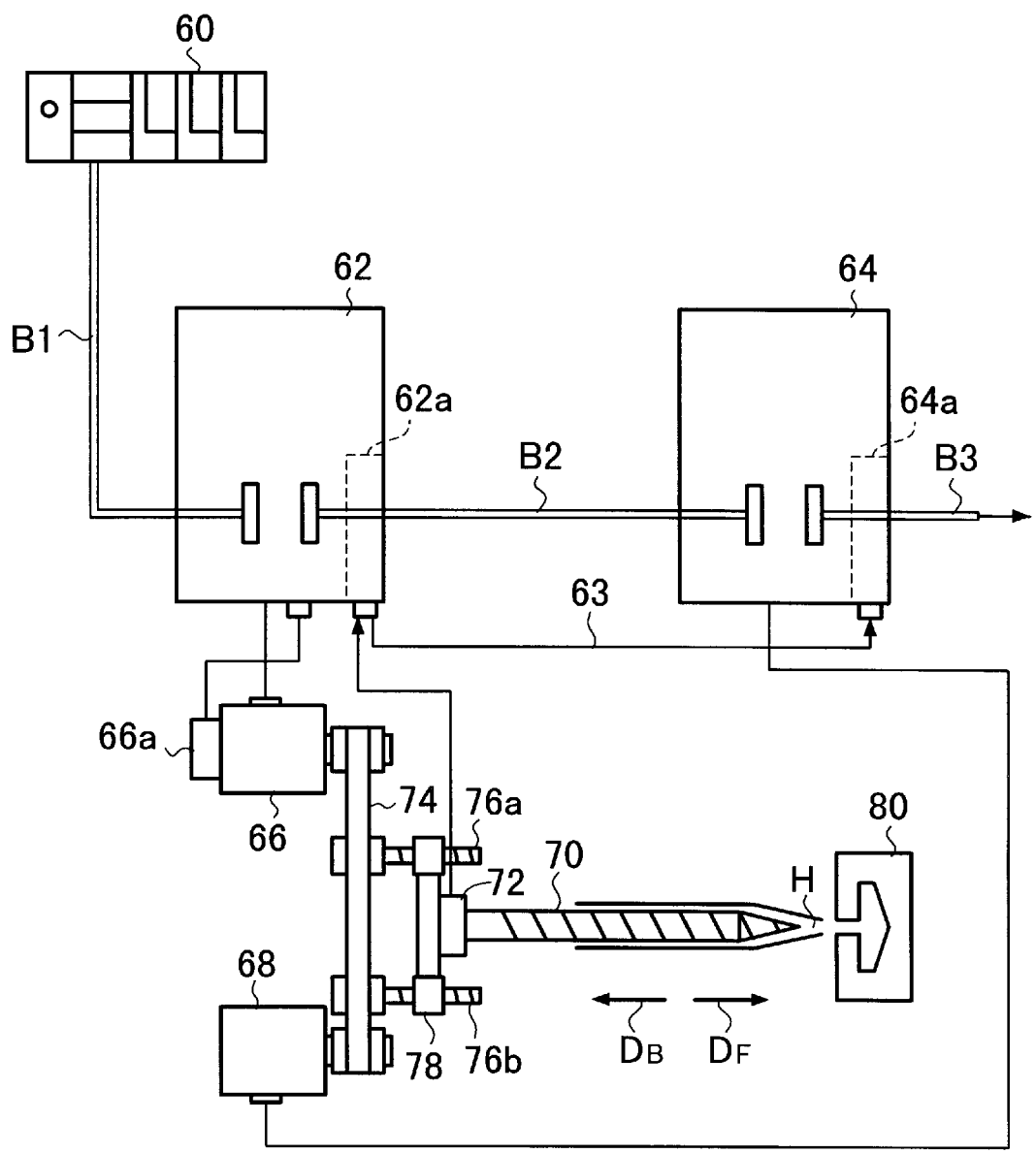
FIG. 5 is a schematic diagram showing an outline construction of the drive control apparatus for the electric injection molding machine in accordance with embodiment 2 of the invention.

FIG. 5 is a schematic diagram showing an outline construction of the drive control apparatus for the electric injection molding machine in accordance with embodiment 2 of the invention. In FIG. 5, parts identical to those shown in FIG. 1 will be designated by the same reference symbols; hence, the description thereof will be omitted.

Different from the aforementioned drive control apparatus of the embodiment 1 shown in FIG. 1, the drive control apparatus of the embodiment 2 shown in FIG. 5 is constructed such that the servo amplifiers are sequentially connected together in series. That is, the master servo amplifier 62 is connected to the slave servo amplifier 64 by means of a signal line B2, while the slave servo amplifier 64 is connected to another slave servo amplifier (not shown) by means of a signal line B3.

Figure 6:
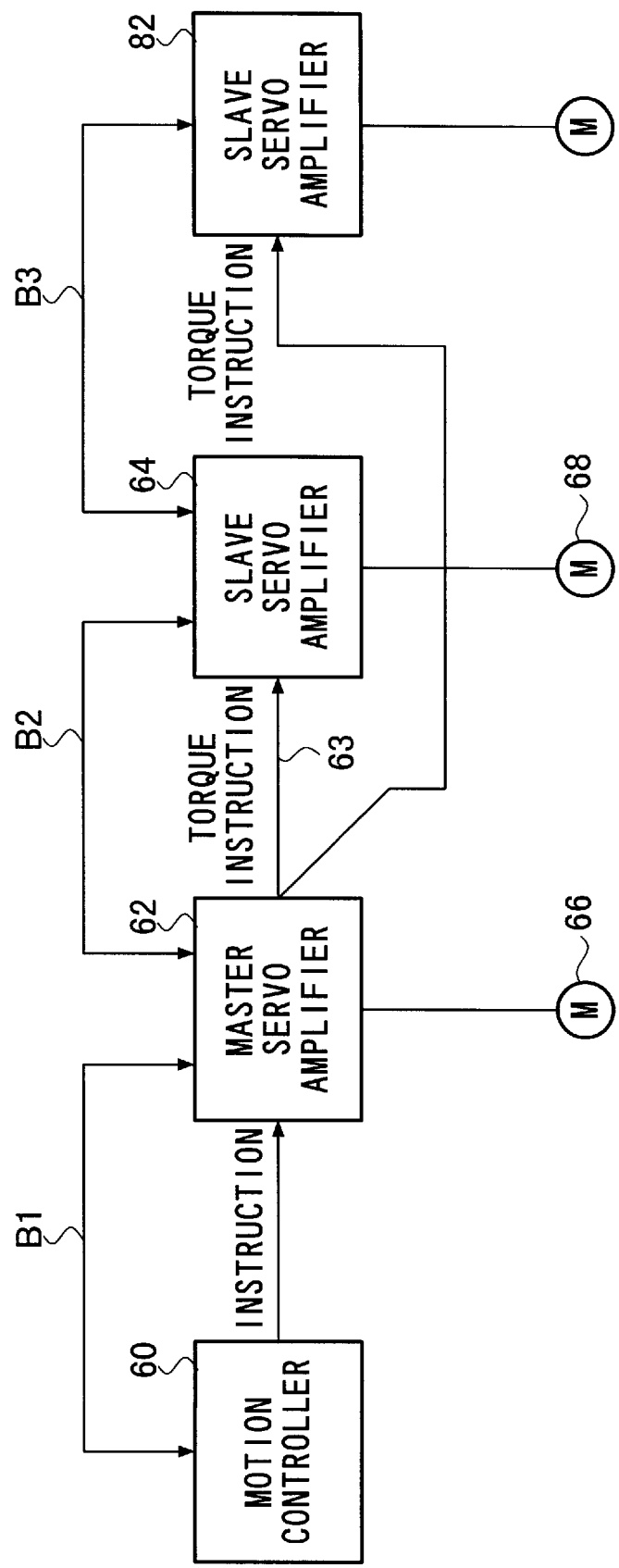
FIG. 6 is a schematic block diagram showing a simplified configuration establishing connections between servo amplifiers and servo motors in the embodiment 2.

FIG. 6 is a schematic block diagram showing a simplified configuration establishing connections between the servo amplifiers and servo motors in accordance with the embodiment 2. As shown in FIG. 6, the motion controller 60, master servo amplifier 62 and slave servo amplifier 64 as well as another slave servo amplifier 82 are sequentially connected together in series by means of the signal lines B1, B2 and B3.

Herein, the motion controller 60 produces a synchronizing signal in addition to the foregoing drive instruction signal.

The above signals output from the motion controller 60 are forwarded to the master servo amplifier 62 via the signal line B1. Like the aforementioned embodiment 1, the master servo amplifier 62 employed in the embodiment 2 delivers a torque instruction signal to the slave servo amplifiers 64 and 82 on the basis of the drive instruction signal for the screw 70. In addition, the master servo amplifier 62 drives the inverter thereof in synchronization with the synchronizing signal.

The synchronizing signal input to the master servo amplifier 62 is also forwarded to the slave servo amplifier 64 via the signal line B2. Thus, the slave servo amplifier 64 drives the inverter thereof in response to the synchronizing signal input thereto.

As described above, the inverters of the master servo amplifier 62 and slave servo amplifier 64 are driven in synchronization with the same synchronizing signal output from the motion controller 60. Thus, it is possible to reduce a difference between times that the servo motors 66 and 68 respectively produce powers. For this reason, the drive control apparatus of the embodiment 2 is capable of coping with an instruction to rapidly change position of the screw 70 in a stable manner.

In addition, the embodiment 2 is designed such that a number of the slave servo amplifiers drive the respective servo motors in synchronization with the synchronizing signal.

[C] Embodiment 3

Figure 7:
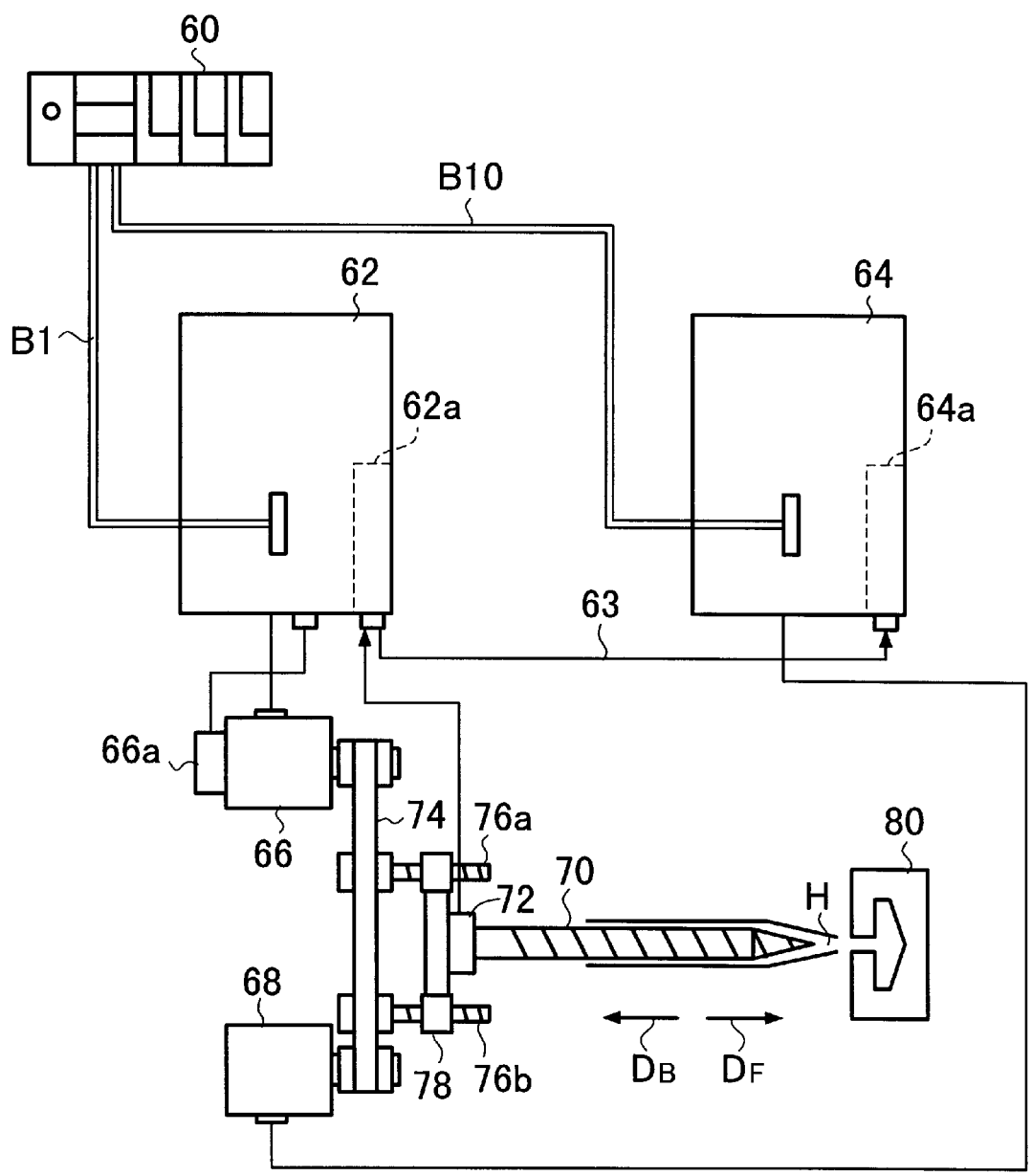
FIG. 7 is a schematic diagram showing an outline construction of the drive control apparatus for the electric injection molding machine in accordance with embodiment 3 of the invention.

FIG. 7 is a schematic diagram showing an outline construction of the drive control apparatus for the electric injection molding machine in accordance with embodiment 3 of the invention. In FIG. 7, parts identical to those shown in FIG. 1 and FIG. 5 will be designated by the same reference symbols; hence, the description thereof will be omitted.

Different from the aforementioned drive control apparatus of the embodiment 1 shown in FIG. 1, the drive control apparatus of the embodiment 3 shown in FIG. 7 is constructed such that the motion controller is connected respectively to the servo amplifiers by means of different signals lines. That is, the motion controller 60 is connected to the master servo amplifier 62 via the signal line B1 while the motion controller 60 is also connected to the slave servo amplifier 64 via a signal line B10.

Figure 8:
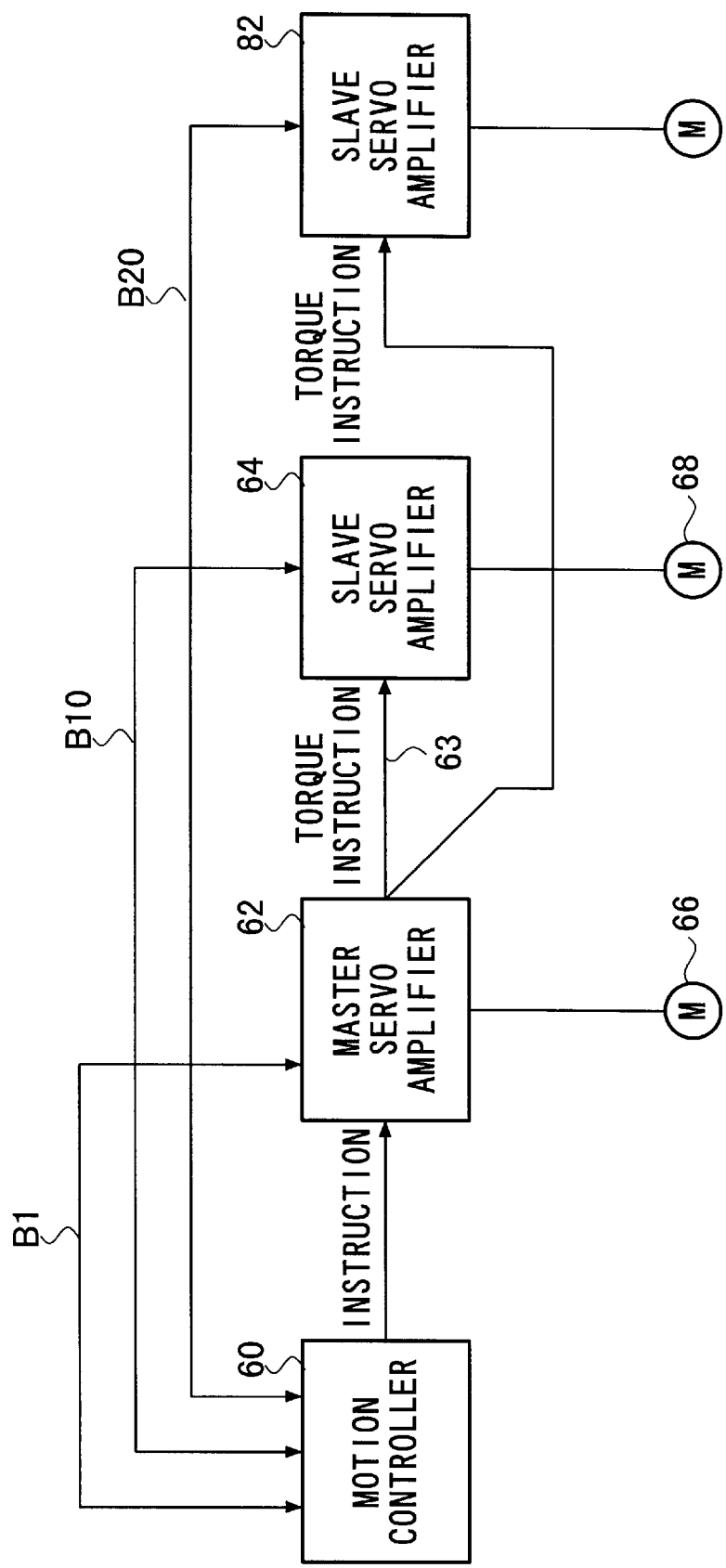
FIG. 8 is a schematic block diagram showing a simplified configuration establishing connections between servo amplifiers and servo motors in the embodiment 3.
Figure 9:
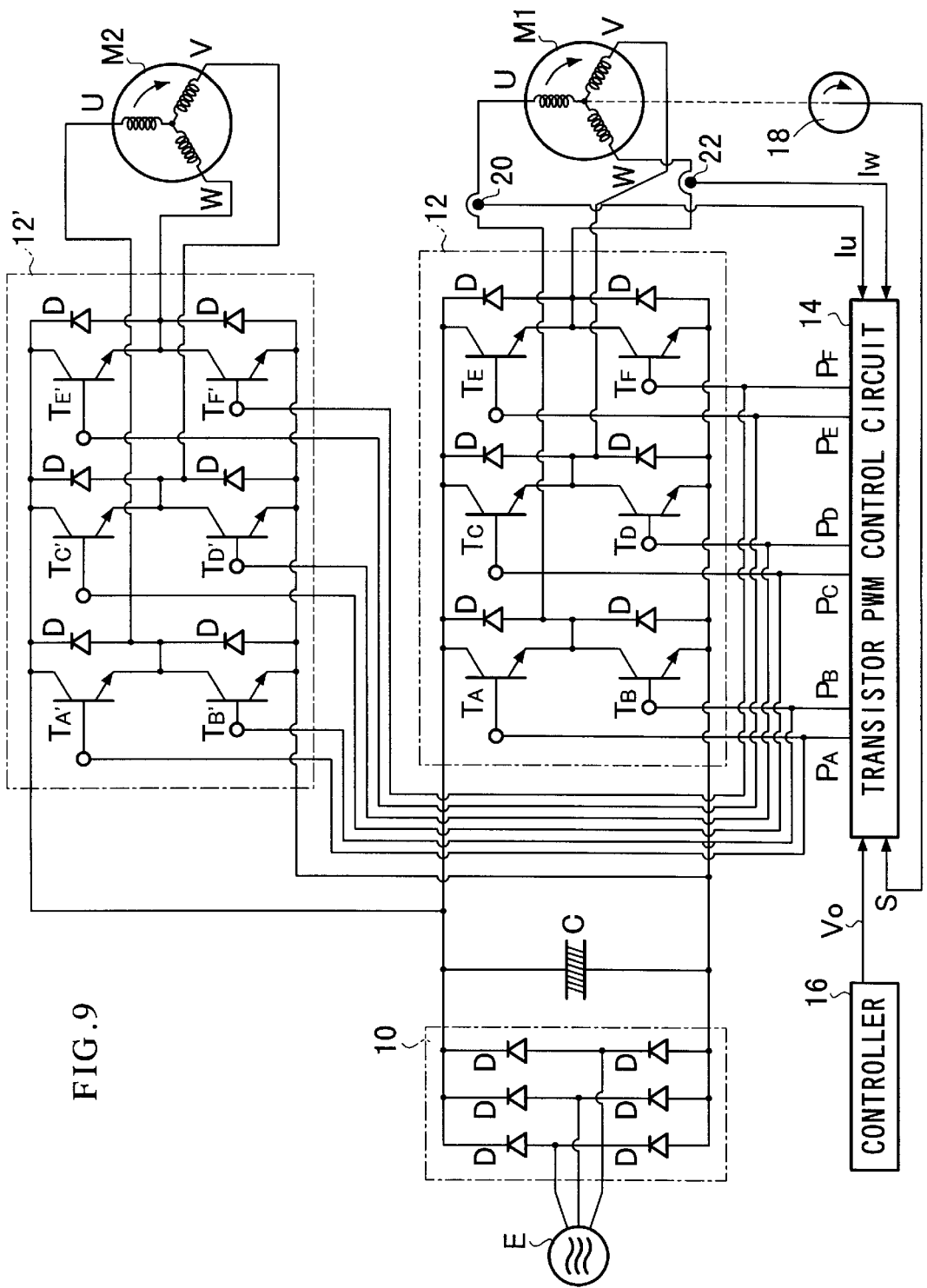
FIG. 9 is a circuit diagram showing a first example of the drive control apparatus for controlling multiple servo motors.
Figure 10:
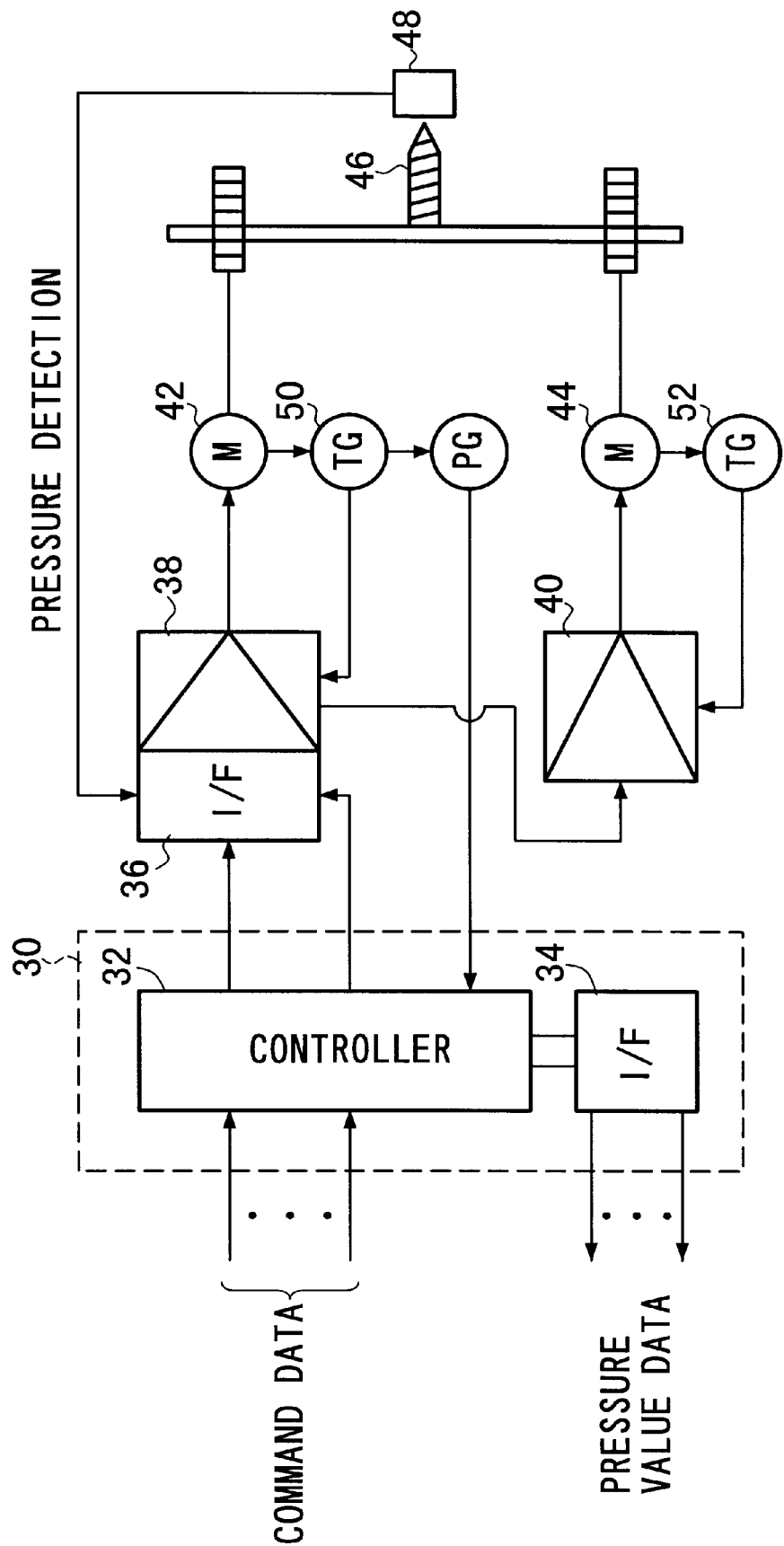
FIG. 10 is a schematic block diagram showing a second example of the drive control apparatus for controlling multiple servo motors.

FIG. 8 is a schematic block diagram showing a simplified configuration establishing connections between the servo amplifiers and servo motors in accordance with the embodiment 3. That is, the motion controller 60 is connected to the master servo amplifier 62 via the signal line B1; it is connected to the slave servo amplifier 64 via the signal line B10; and it is further connected to the slave servo amplifier 82 via a signal line B20.

The motion controller 60 employed in the embodiment 3 produces a synchronizing signal in addition to the foregoing drive control signal.

The above signals output from the motion controller 60 are forwarded to the master servo amplifier 62 via the signal line B1. Like the aforementioned embodiment 1, the master servo amplifier 62 employed in the embodiment 3 calculates a torque instruction signal based on the drive instruction signal for the screw 70. Then, the master servo amplifier 62 delivers the torque instruction signal to the slave servo amplifiers 64 and 82. In addition, the master servo amplifier 62 drives the inverter thereof in synchronization with the synchronizing signal.

The synchronizing signal output from the motion controller 60 is supplied to the slave servo amplifier 64 via the signal line B10. It is also supplied to the slave servo amplifier 82 via the signal line B20.

Thus, the slave servo amplifiers 64 and 82 drive the inverters thereof in response to the synchronizing signal.

Therefore, like the aforementioned embodiment 2, the master servo amplifier 62 and the slave servo amplifier 64 drive the inverters thereof respectively in synchronization with the synchronizing signal output from the motion controller 60. Thus, it is possible to reduce a difference between times that the servo motors 66 and 68 produce powers respectively. For this reason, the embodiment 3 is capable of coping with an instruction to rapidly change position of the screw 70 in a stable manner.

Further, like the embodiment 3, the embodiment 3 is designed such that a number of the slave servo amplifiers drive the respective servo motors in synchronization with the synchronizing signal.

The aforementioned embodiments are described such that the screw 70 is driven using two servo motors 66 and 68. However, the present invention is not limited to those embodiments. That is, the heart of the technology of the present invention is applicable to other operations other than drive control operation of the screw 70. For example, the present invention is applicable to closing operation of the metal mold 80, ejector operation of molded goods and rotation operation of the screw 70 as well.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds are therefore intended to be embraced by the claims.

What is claimed is:

1. A drive control apparatus for an electric injection molding machine, comprising:

operation instruction means for issuing an operation instruction instructing an operation of a drive portion of the electric injection molding machine;

drive means having at least two servo motors for driving the drive portion;

master drive control means which is provided for one of the two servo motors to perform drive control on its corresponding servo motor in accordance with the operation instruction given from the operation instruction means; and slave drive control means which is provided for another one of the two servo motors to drive its corresponding servo motor, wherein the master drive control means outputs a torque instruction signal to the slave drive control means, so that the slave drive control means performs torque control on its corresponding servo motor on the basis of the torque instruction signal.

2. A drive control apparatus for the electric injection molding machine according to claim 1, wherein the operation instruction means delivers a synchronizing signal to the master drive control means and the slave drive control means respectively, so that the master drive control means and the slave drive control means drive the corresponding slave motors respectively in synchronization with the synchronizing signal.

3. A drive control apparatus for the electric injection molding machine according to claim 1, wherein the operation instruction means, the master drive control means and the slave drive control means are sequentially connected together by respective signal lines, so that the master drive control means and the slave drive control means drive the corresponding servo motors respectively in accordance with a synchronizing signal which is supplied thereto from the operation instruction means via the signal lines.

4. A drive control apparatus for the electric injection molding machine according to any one of claims 1 to 3, wherein capacity of the servo motor corresponding to the master drive control means differs from capacity of the servo motor corresponding to the slave drive control means.

5. A drive control apparatus for an electric injection molding machine in which a screw is used to inject melted resin into a cavity of a metal mold, said drive control apparatus comprising:

drive means, using first and second servo motors, for driving the screw to move in a desired direction;

a motion controller for producing a drive control signal to control operation of the screw;

a master servo amplifier for inputting the drive control signal to control the first servo motor by using a position of a rotor of the first servo motor as a feedback value, the master servo amplifier further producing a torque instruction signal representing a ratio against rated output of the first servo motor by which the first servo motor is to be driven; and a slave servo amplifier for controlling the second servo motor based on the torque instruction signal.

6. A drive control apparatus for the electric injection molding machine according to claim 5, wherein the first servo motor is equipped with a position detector for detecting the position of the rotor of the first servo motor.

7. A drive control apparatus for the electric injection molding machine according to claim 5, wherein the drive means is constructed such that the first and second servo motors are connected together using a belt to provide drive power to the screw.

8. A drive control apparatus for the electric injection molding machine according to claim 5, wherein the motion controller supplies a synchronizing signal to the master and slave servo amplifiers respectively so that the first and second servo motors are driven in a synchronized manner.

* * * * *